(12) United States Patent
Kato et al.

(10) Patent No.: US 7,662,229 B2
(45) Date of Patent: Feb. 16, 2010

(54) CEMENT SETTING ACCELERATOR

(75) Inventors: Hiroyoshi Kato, Shunan (JP); Shingo Hiranaka, Shunan (JP); Genji Taga, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 111 days.

(21) Appl. No.: 10/575,756

(22) PCT Filed: Oct. 14, 2004

(86) PCT No.: PCT/JP2004/015539

§ 371 (c)(1),
(2), (4) Date: Apr. 13, 2006

(87) PCT Pub. No.: WO2005/037730

PCT Pub. Date: Apr. 28, 2005

(65) Prior Publication Data

US 2007/0151483 A1     Jul. 5, 2007

(30) Foreign Application Priority Data

Oct. 16, 2003  (JP) ............................. 2003-356885
May 7, 2004    (JP) ............................. 2004-138284

(51) Int. Cl.
*C04B 22/06* (2006.01)
*C04B 28/02* (2006.01)

(52) U.S. Cl. ...................... 106/792; 106/461; 106/695; 106/819

(58) Field of Classification Search ................. 106/461, 106/792, 819, 695; 423/635
See application file for complete search history.

(56) References Cited

U.S. PATENT DOCUMENTS 4,205,998 A * 6/1980 Simeonov et al. ........... 106/787
4,650,523 A * 3/1987 Kikuchi et al. .............. 106/819
5,518,980 A * 5/1996 Lin ............................ 502/400
2004/0129175 A1* 7/2004 Butters et al. ............... 106/461

FOREIGN PATENT DOCUMENTS

| JP | 58-17816 A | * | 2/1983 |
| JP | 08-041455 A | | 2/1996 |
| JP | 2001-233661 A | | 8/2001 |
| JP | 2003-246657 A | | 9/2003 |
| JP | 2003-277111 A | | 10/2003 |

OTHER PUBLICATIONS

Machine Translation of JP 2001-233661A (Oct. 2, 2003).*
Uchikawa et al., The bulletin of The Association of the Ceramic Industry, vol. 93, No. 4., pp. 45-52 (1985) no month).
Grigoryev et al., "Lime, its manufacture and use", 1944, pp. 113 (with English language translation) (no month).
Study on Synthesis and Characterization of Nano-Scale CA(OH)2 and Its Application in the Environmentally Friendly Plastics, 2003.
V. Duda, "Cement", Moscow Strojizdat 1981, pp. 173-174. (with English language translation).
Dec. 17, 2008 Office Action from the corresponding Russian application and English Translation.
Dec. 25, 2007 Office Action from the corresponding Russian application and English language Translation.

* cited by examiner

*Primary Examiner*—Anthony J Green
(74) *Attorney, Agent, or Firm*—Birch, Stewart, Kolasch & Birch, LLP

(57) ABSTRACT

A cement setting accelerator comprising calcium hydroxide particles having an average particle diameter of 3 μm or less, and a cement composition comprising 100 parts by weight of a cement and 0.05 to 10 parts by weight of the above setting accelerator. A wet ground product of calcium hydroxide or a fine precipitate formed by a reaction between a calcium salt and an alkali hydroxide can be used as the above calcium hydroxide particles.

This setting accelerator shows a high setting accelerating effect and does not exert a bad influence upon the quality, especially durability of a hardened product of the cement composition.

15 Claims, No Drawings

CEMENT SETTING ACCELERATOR

FIELD OF THE INVENTION

The present invention relates to a novel cement setting accelerator, a cement composition and a manufacturing process thereof. More specifically, it relates to a cement setting accelerator comprising calcium hydroxide whose average particle diameter is adjusted to 3 μm or less, a cement composition comprising the setting accelerator and a manufacturing process thereof.

DESCRIPTION OF THE PRIOR ART

For construction using a cement-based hydraulic composition such as mortar or concrete, the control of setting time is desired with a view to ensuring workability, shortening the construction time and simplifying a curing facility. As demand for a setting accelerating effect in particular is growing so as to shorten the construction time, simplify a curing facility and ensure workability in a cold district, the development of a setting accelerator having a high setting accelerating effect is expected.

Typical setting accelerators which have been proposed include chlorides such as calcium chloride, sodium chloride and potassium chloride and alkali compounds such as sodium hydroxide and potassium hydroxide all of which have a high setting accelerating effect.

However, when these compounds are used, the probability of a phenomenon that a chloride or an alkali contained in a hardened product increases in quantity and exerts a bad influence upon the durability of the hardened product, such as the corrosion of a reinforcing bar or the alkali-aggregate reaction, rises. Therefore, the use of these compounds is very limited from the viewpoint of ensuring the durability of the hardened product and the number of actual use cases is extremely small.

Up till now, useful setting accelerators other than the above compounds have not been put to practical use, and the development of a setting accelerator which has a high setting accelerating effect and does not exert a bad influence upon the quality, especially durability of a hardened product is desired.

Meanwhile, calcium hydroxide is a compound which does not cause the above problems when it is added to a cement-based water-setting composition.

The bulletin of the Association of the Ceramic Industry, vol. 93, No. 4, pp. 45-52, 1985 discloses that a cement having a specific surface area by Blaine of 3,200 cm$^2$/g is prepared by adding 1% of calcium hydroxide to cement and grinding the resulting mixture in a test mill, this cement is divided into five groups of particles by an air jet sieve to determine the amount of free CaO of each group by a glycerin-alcohol method, CaO is existent in a group of particles having a particle diameter of 10 μm or less in an amount of about 0.5%, and the initial setting time and final setting time of this cement become shorter than when calcium hydroxide is not added.

However, the above document fails to disclose the relationship between the particle size of calcium hydroxide and the setting time of the cement and merely shows that calcium hydroxide promotes the setting of the cement when it has a particle size around 10 μm.

SUMMARY OF THE INVENTION

It is therefore an object of the present invention to provide a setting accelerator which has a high setting accelerating effect when it is added to a cement-based hydraulic composition and does not exert a bad influence upon the quality, especially durability of a hardened product.

It is another object of the present invention to provide a cement setting accelerator capable of developing a high setting accelerating effect by adjusting the particle size of calcium hydroxide which is a type of cement hydrate and has not been actually used as a setting accelerator to a specific value.

It is still another object of the present invention to provide a cement composition comprising the above cement setting accelerator.

It is a further object of the present invention to provide a process for manufacturing the above cement composition.

Other objects and advantages of the present invention will become apparent from the following description.

According to the present invention, firstly, the above objects and advantages of the present invention are attained by a cement setting accelerator comprising calcium hydroxide particles having an average particle diameter of 3 μm or less.

According to the present invention, secondly, the above objects and advantages of the present invention are attained by a cement composition which comprises 100 parts by weight of a cement and 0.05 to 10 parts by weight of calcium hydroxide as the above cement setting accelerator of the present invention.

According to the present invention, thirdly, the above objects and advantages of the present invention are attained by a process for manufacturing a cement composition, comprising adding a water slurry of calcium hydroxide particles having an average particle diameter of 3 μm or less to a cement.

THE PREFERRED EMBODIMENT OF THE INVENTION

The present invention will be described in detail hereinunder.

In the present invention, it is important that the average particle diameter of calcium hydroxide particles constituting a setting accelerator should be adjusted to 3 μm or less. The average particle diameter is adjusted to preferably 2 μm or less, more preferably 1 μm or less. That is, by adjusting its average particle diameter to the above range, calcium hydroxide can have a greatly improved setting accelerating effect and can exhibit a practical function as a setting accelerator.

In the present invention, to obtain calcium hydroxide particles having an average particle diameter of 3 μm, wet grinding is recommended because its grinding efficiency is high and powerful grinding is possible. More specifically, wet grinding with a grinder typified by a ball mill is recommended. Water is the most suitable as a dispersion medium used for the above wet grinding in consideration of reactivity and handling ease when a slurry of calcium hydroxide particles is added to a cement.

To obtain a slurry having a high calcium hydroxide content of 20 to 60 wt % which has high grinding efficiency and high handling ease, a dispersant is preferably used at the time of grinding.

Any dispersant may be used without restrictions if it has the effect of dispersing calcium hydroxide particles. Preferred examples of the dispersant include cement dispersants comprising a lignin sulfonate, melamine sulfonate, naphthalene sulfonate or polycarboxylate-based polymer as the main component. Out of these, a polycarboxylate-based polymer is more preferred. A compound having a polyethylene glycol chain is preferred because it has high dispersibility.

Most of the above compounds are available on the market as cement dispersants and can be easily acquired.

As preferred means of obtaining fine calcium hydroxide, gypsum is reacted with an alkali hydroxide in a water solvent to obtain calcium hydroxide as a fine precipitate. Through this reaction, calcium hydroxide particles having an average particle diameter of 3 μm or less can be easily obtained industrially.

Stating the above method in more detail, the gypsum to be reacted with the alkali hydroxide preferably has an average particle diameter of 0.1 to 500 μm, preferably 5 to 100 μm. An alkali hydroxide aqueous solution has an alkali hydroxide content of preferably 0.1 to 50 wt %, particularly preferably 5 to 15 wt % in consideration of reactivity with the gypsum. The alkali hydroxide aqueous solution having the above content can be advantageously obtained by diluting an alkali hydroxide aqueous solution having an alkali hydroxide content of 30 to 48 wt % with water. The above alkali hydroxide is typically sodium hydroxide or potassium hydroxide, particularly preferably sodium hydroxide.

In order to react the above gypsum with the alkali hydroxide in water, the gypsum and the alkali hydroxide are mixed together in a reactor equipped with a stirrer or a mixer in a pipe, or a pressure nozzle type stirrer in which a processing fluid is injected from a nozzle by a high-pressure plunger pump and stricken against a fixed plate is used.

As for the ratio of the gypsum to the alkali hydroxide, the alkali hydroxide is used in an amount of preferably 1.0 to 1.5 parts by mole, more preferably 1.0 to 1.1 parts by mole based on 1 part by mole of the gypsum. The temperature at the time of contact between them is preferably 10 to 40° C. Further, the pressure is preferably normal pressure.

The above reaction time which depends on the content of the alkali hydroxide and the particle diameter of the ground product is preferably 5 to 60 minutes. In this reaction, a precipitate of calcium hydroxide is formed in the same reaction solution.

To collect the formed precipitate of calcium hydroxide, a filter such as a rotary screen, drum filter, disk filter, Nutche filter, filter press, screw press or tube press, or a centrifugal separator such as a screw decanter or screen decanter is preferably used for separation from a liquid phase. The obtained precipitate of calcium hydroxide is preferably fully rinsed in water.

To obtain a fine precipitate of calcium hydroxide, besides the above method, a method in which calcium chloride and an alkali hydroxide are reacted with each other in a water solvent may be employed.

The calcium hydroxide particles constituting the setting accelerator of the present invention are preferably used in the form of a slurry containing water as a dispersion medium to achieve a small particle diameter. That is, when the calcium hydroxide particles obtained by the above method are dried, it is possible that the agglomeration of the particles occurs, thereby increasing the average particle diameter to more than 3 μm. Therefore, it is preferred that the calcium hydroxide particles should be used as a setting accelerator without being dried after water is removed from a slurry obtained by the above wet grinding or from a slurry obtained by the above reaction.

In the present invention, when the above calcium hydroxide is used in the form of the above slurry, the above dispersant is desirably added to reduce the viscosity of the slurry.

The setting accelerator of the present invention is added to a cement to prepare a cement composition. As for the content of the setting accelerator in the cement composition, the amount of calcium hydroxide is 0.05 to 10 parts by weight, preferably 0.1 to 6 parts by weight based on 100 parts by weight of the cement. When the amount of calcium hydroxide is smaller than 0.05 part by weight, a satisfactory setting accelerating effect is not obtained and when the amount is larger than 10 parts by weight, the setting accelerating effect reaches the top, which is not preferred from an economical point of view.

In the present invention, although the method of adding the setting accelerator is not particularly limited, the setting accelerator is preferably added in the form of a slurry to the cement. Stated more specifically, it is preferable that the setting accelerator is added in the form of a slurry when a cement-based water-setting composition typified by cement paste, mortar or concrete is prepared by mixing the cement with water, or that the slurry is added and mixed with the prepared cement-based water-setting composition.

In the above method in which the slurry is added, when a slurry whose viscosity has been reduced by adding a dispersant is used, it can be added to the cement more easily.

In the present invention, the cement is not limited to a particular kind if it is a commonly used cement. Examples of the cement include Portland cement specified as JIS R 5210 "Portland cement", blast furnace cement specified as JIS R 5211 "blast furnace cement", silica cement specified as JIS R 5212 "silica cement" and fly ash cement specified as JIS R 5213 "fly ash cements."

Out of these, a Portland cement is preferred. The above cement preferably has a specific surface area by Blaine of 2,000 to 5,000 $cm^2/g$.

Further, the above Portland cement has a $3CaO.SiO_2$ content of preferably 50 wt % or more, more preferably 60 wt % or more because it can exhibit not only a setting accelerating effect but also high strength developability at an early age. The upper limit of the $3CaO.SiO_2$ content is generally 75 wt %.

In general, when the above $3CaO.SiO_2$ content is 50 wt % or more and less than 60 wt %, a normal Portland cement can be advantageously used and when the $3CaO.SiO_2$ content is 60 wt % or more, an early-strength Portland cement can be advantageously used.

Since the setting accelerating effect may be impaired when the setting accelerator of the present invention is used in combination with a large amount of an aluminum compound such as calcium aluminate, the amount of the aluminum compound is desirably adjusted to 5 parts or less by weight based on 100 parts by weight of the cement. An aluminum compound such as calcium aluminate contained as a component of the cement is not included in the amount of the aluminum compound.

The setting accelerator of the present invention may be used at the same time as known additives such as a cement dispersant, air entraining agent, inhibitor, segregation reducing agent, thickening agent, shrinkage reducing agent, expansive agent, calcium hydroxide having an average particle diameter larger than 3 μm, setting accelerator, gypsum, blast furnace slag, fly ash, silica fume, limestone fine powder and mineral fine powder in limits that do not greatly impair the effect of the present invention.

Since the cement setting accelerator of the present invention has an excellent setting accelerating effect and does not contain a component which exerts a bad influence upon the durability of a cement hardened product after hardened as described above, it can be generally used as a setting accelerator for a cement-based water-setting composition such as cement paste, mortar or concrete without limiting its application purpose. Therefore, it is of great industrial value.

EXAMPLES

The following examples are provided for the purpose of further illustrating constitution and the present invention but are in no way to be taken as limiting.

(1) Method of Evaluation Average Particle Diameter

The particle size distribution of calcium hydroxide is measured by using ethanol as a dispersion medium and a laser diffraction particle size distribution measuring instrument to calculate a volume average diameter from the measurement result as average particle diameter.

(2) Method of Evaluating Setting Time

The setting time of a cement paste containing the setting accelerator is measured by a method specified in JIS R 5201 "physical testing method of cement". Calcium hydroxide is added to a cement.

Examples 1 to 3

Calcium hydroxide particles having average particle diameters of 2.5 μm, 1.3 μm and 0.5 μm obtained by wet grinding using water as a dispersion medium were mixed in the form of a slurry with a cement and ion-exchanged water in an amount of 3.1 wt % based on the cement to obtain cement pastes so as to measure their setting times. A commercially available normal Portland cement was used as the cement. The results are shown in Table 1.

Comparative Example 1

The setting time of a cement paste which was prepared under the same conditions as in Example 1 except that calcium hydroxide was not added was measured. The results are shown in Table 1.

Comparative Examples 2 to 5

Cement pastes were obtained under the same conditions as in Example 1 except that calcium hydroxides having average particle diameters of 62.0 μm, 23.5 μm, 6.5 μm and 3.8 μm were used to measure their setting times. The results are shown in Table 1.

TABLE 1

|  | Average particle diameter of Ca(OH)$_2$ (μm) | Setting time (h:m) | |
|---|---|---|---|
|  |  | Initial setting time | Final setting time |
| Example 1 | 2.5 | 1:25 | 1:50 |
| Example 2 | 1.3 | 1:20 | 1:45 |
| Example 3 | 0.5 | 1:10 | 1:40 |
| Comparative Example 1 | — | 2:10 | 3:30 |
| Comparative Example 2 | 62.0 | 2:00 | 2:45 |
| Comparative Example 3 | 23.5 | 1:55 | 2:40 |
| Comparative Example 4 | 6.5 | 1:55 | 2:30 |
| Comparative Example 5 | 3.8 | 1:45 | 2:15 |

Examples 4 to 5

Cement pastes were obtained under the same conditions as in Example 1 except that calcium hydroxide particles having an average particle diameter of 0.5 μm obtained by wet grinding using water as a dispersion medium were added in the form of a slurry to a cement in amounts of 2.0 wt % and 4.0 wt % based on the cement. The setting times of the cement pastes were measured. The results are shown in Table 2.

TABLE 2

|  | Amount of Ca(OH)$_2$ (wt %) | Setting time (h:m) | |
|---|---|---|---|
|  |  | Initial setting time | Final setting time |
| Example 4 | 2.0 | 1:20 | 1:50 |
| Example 5 | 4.0 | 1:05 | 1:35 |

Examples 6 to 8

Slurries prepared by adding calcium hydroxide particles having an average particle diameter of 0.2 μm obtained by wet grinding using water as a dispersion medium to 9.0 wt % based on the calcium hydroxide of a polycarboxylate-based cement dispersant were mixed with a cement and ion-exchanged water in amounts of 0.9 wt %, 1.8 wt % and 3.2 wt % based on the cement to prepare cement pastes and measure their setting times. A commercially available normal Portland cement was used as the cement. The results are shown in Table 3.

TABLE 3

|  | Amount of Ca(OH)$_2$ (wt %) | Setting time (h:m) | |
|---|---|---|---|
|  |  | Initial setting time | Final setting time |
| Example 6 | 0.9 | 1:25 | 1:55 |
| Example 7 | 1.8 | 1:20 | 1:45 |
| Example 8 | 3.2 | 1:05 | 1:25 |

Example 9

A slurry containing calcium hydroxide particles having an average particle diameter of 0.5 μm obtained by wet grinding using water as a dispersion medium was mixed with a cement and ion exchange water in an amount of 3.1 wt % based on the cement to obtain a cement paste and measure its setting time. A low-temperature Portland cement (2CaO.SiO$_2$ content of 62 wt %) was used as the cement. The results are shown in Table 4.

Comparative Example 6

The setting time of a cement paste which was prepared under the same conditions as in Example 9 except that calcium hydroxide was not added was measured. The results are shown in Table 4.

TABLE 4

|  | Amount of Ca(OH)$_2$ (wt %) | Setting time (h:m) | |
|---|---|---|---|
|  |  | Initial setting time | Final setting time |
| Example 9 | 3.1 | 1:45 | 2:50 |
| Comparative Example 6 | — | 3:40 | 6:15 |

Example 10

The setting time of a cement paste which was prepared under the same conditions as in Example 9 except that a commercially available type B blast furnace slag cement was used was measured. The results are shown in Table 5.

Comparative Example 7

The setting time of a cement paste which was prepared under the same conditions as in Example 9 except that calcium hydroxide was not added was measured. The results are shown in Table 5.

TABLE 5

|  | Amount of $Ca(OH)_2$ (wt %) | Setting time (h:m) | |
| --- | --- | --- | --- |
|  |  | Initial setting time | Final setting time |
| Example 10 | 3.1 | 1:30 | 2:10 |
| Comparative Example 7 | — | 3:05 | 4:50 |

Examples 11 and 12

1.0 and 3.1 parts by weight of calcium hydroxide particles having an average particle diameter of 0.4 μm obtained by wet grinding using water as a dispersion medium were added in the form of a slurry to 100 parts by weight of a commercially available normal Portland cement so as to prepare concrete compositions comprising water, cement, calcium hydroxide, fine aggregate, coarse aggregate and AE water reducing agent of a standard type in ratios shown in Table 6 and measure their setting times. The conditions of mix proportions of concrete were a slump of 18.0±2.5 cm and an air content of 4.5±1.5%. The setting time was measured in accordance with JIS A1147 "Method of testing the setting time of concrete". The testing temperature was 5° C. The results are shown in Table 7.

Comparative Example 8

The setting time and the compressive strength of the concrete were measured in the same manner as in Example 11 except that calcium hydroxide was not added. The composition is shown in Table 6 and the results are shown in Table 7.

TABLE 7

|  | Setting time (h:m) | |
| --- | --- | --- |
|  | Initial setting time | Final setting time |
| Example 11 | 13:50 | 19:35 |
| Example 12 | 11:55 | 16:35 |
| Comparative Example 8 | 16:50 | 25:55 |

Example 13

5.3 parts by weight of calcium hydroxide particles having an average particle diameter of 0.45 μm was added to 100 parts by weight of a commercially available early-strength Portland cement to prepare a concrete composition comprising water, cement, calcium hydroxide particles, fine aggregate, coarse aggregate and commercially available polycarboxylic acid-based high-performance AE water reducing agent in a ratio shown in Table 8 and measure its compressive strength. The conditions of mix proportions of concrete were a slump of 8.0±2.5 cm and an air content of 3.0±1.0%. The compressive strength was measured in accordance with JIS A 1108 "Method of testing the compressive strength of concrete". The testing temperature was 20° C. The results are shown in Table 9.

Example 14

The same experiment as in Example 13 was conducted except that the amount of the calcium hydroxide particles was changed to 7.9 parts by weight. The results are shown in Table 9.

Example 15

The same experiment as in Example 13 was conducted except that the average particle diameter of the calcium hydroxide particles was changed to 1.6 μm. The results are shown in Table 9.

Example 16

The same experiment as Example 13 was conducted except that 5.7 parts by weight of calcium hydroxide particles having

TABLE 6

| | Unit weight (kg/m³) | | | | | | |
| --- | --- | --- | --- | --- | --- | --- | --- |
| | Water/powder ratio (%) | Water | Cement | Calcium hydroxide | Fine aggregate | Coarse aggregate | AE water reducing agent |
| Example 11 | 50 | 164 | 324.7 | 3.3 | 833 | 990 | 0.82 |
| Example 12 | | 164 | 318.1 | 9.9 | 831 | 990 | 0.82 |
| Comparative Example 8 | 50 | 164 | 328 | — | 834 | 990 | 0.82 | an average particle diameter of 0.18 μm was added to 100 parts by weight of a commercially available normal Portland cement to prepare a concrete composition comprising water, cement, calcium hydroxide, fine aggregate, coarse aggregate and commercially available polycarboxylate-based high-performance AE water reducing agent in a ratio shown in Table 8. The results are shown in Table 9.

Comparative Example 9

The same experiment as in Example 13 was conducted except that a commercially available early-strength Portland cement was used to prepare a concrete composition comprising water, cement, fine aggregate, coarse aggregate and commercially available polycarboxylate-based high-performance AE water reducing agent in a ratio shown in Table 8. The results are shown in Table 9.

Comparative Example 10

The same experiment as in Example 13 was conducted except that 5.3 parts by weight of calcium hydroxide particles having an average particle diameter of 12.0 μm was added to 100 parts by weight of a commercially available early-strength Portland cement to prepare a concrete composition comprising water, cement, calcium hydroxide, fine aggregate, coarse aggregate and commercially available polycarboxylate-based high-performance AE water reducing agent in a ratio shown in Table 8. The results are shown in Table 9.

TABLE 8

| | | Unit weight (kg/m³) | | | | | |
|---|---|---|---|---|---|---|---|
| | Water/cement ratio (%) | Water | Cement | Calcium hydroxide | Fine aggregate | Coarse aggregate | High-performance AE water reducing agent |
| Example 13 | 40 | 152 | 380 | 20 | 747 | 1080 | 2.28 |
| Example 14 | | 152 | 380 | 30 | 742 | 1073 | 2.47 |
| Example 15 | | 152 | 380 | 20 | 747 | 1080 | 2.28 |
| Example 16 | 35.7 | 150 | 420 | 24 | 735 | 1063 | 2.94 |
| Comparative Example 9 | 40 | 152 | 380 | — | 757 | 1094 | 1.90 |
| Comparative Example 10 | | 152 | 380 | 20 | 747 | 1080 | 2.09 |

TABLE 9

| | Compressive strength (N/mm²) Age | | |
|---|---|---|---|
| | 1 day | 3 days | 7 days |
| Example 13 | 42.9 | 64.2 | 71.9 |
| Example 14 | 45.7 | 66.8 | 73.8 |
| Example 15 | 41.0 | 62.0 | 70.2 |
| Example 16 | 33.5 | 59.7 | 66.8 |
| Comparative Example 9 | 26.8 | 53.1 | 60.7 |
| Comparative Example 10 | 29.3 | 55.9 | 62.4 |

The invention claimed is:

1. A cement composition
   comprising 100 parts by weight of a cement and
   0.05 to 10 parts by weight of calcium hydroxide particles having an average particle diameter of 2.5 μm or less as a cement setting accelerator for shortening the initial and final setting times of said cement composition.

2. The cement composition according to claim 1, wherein said calcium hydroxide particles as said cement setting accelerator are in the form of a slurry.

3. The cement composition according to claim 1, wherein said calcium hydroxide particles have an average particle diameter of 2 μm or less.

4. The cement composition according to claim 1, wherein said calcium hydroxide particles have an average particle diameter of 1 μm or less.

5. The cement composition according to claim 1, wherein 0.1 to 6 parts of weight of said calcium hydroxide particles are present.

6. The cement composition according to claim 1, further comprising
   5 parts by weight or less of calcium aluminate based upon 100 parts by weight of said cement.

7. The cement composition according to claim 1, wherein said calcium hydroxide particles have an average particle diameter of 1.3 μm or less.

8. A process for manufacturing a cement composition comprising adding a water slurry of calcium hydroxide particles having an average particle diameter of 2.5 μm or less as a cement setting accelerator for shortening the initial and final setting times of said cement composition to a cement.

9. The process according to claim 8, wherein said calcium hydroxide particles have an average particle diameter of 2 μm or less.

10. The process according to claim 8, wherein said calcium hydroxide particles have an average particle diameter of 1 μm or less.

11. The process according to claim 8, wherein 0.05 to 10 parts by weight of calcium hydroxide particles are added to 100 parts by weight of said cement.

12. The process according to claim 8, wherein 0.1 to 6 parts by weight of calcium hydroxide particles are added to 100 parts by weight of said cement.

13. The process according to claim 11, wherein 5 parts by weight or less of calcium aluminate based upon 100 parts by weight is further added to said 100 parts by weight of cement.

14. The process according to claim 8, wherein said calcium hydroxide particles have an average particle diameter of 1.3 μm or less.

15. A cement composition
   comprising 100 parts by weight of a cement and
   a slurry consisting essentially of 0.05 to 10 parts by weight of calcium hydroxide particles having an average particle diameter of 2.5 μm or less as a cement setting accelerator for shortening the initial and final setting times of said cement composition.

* * * * *